Aug. 14, 1962  A. H. MARK ETAL  3,049,128
STRAW WALKERS HAVING INCLINED PLATES
Filed June 5, 1959

INVENTORS.
ALEXANDER HING MARK,
JERZY M. BRZUSTOWSKI &
JOSEPH COLEMAN
BY
*Wolfe, Hubbard, Voit & Osann*
ATTORNEYS.

3,049,128
STRAW WALKERS HAVING INCLINED PLATES
Alexander Hing Mark, Livonia, Mich., and Jerzy M. Brzustowski, Toronto, Ontario, and Joseph Coleman, Downsview, Ontario, Canada, assignors to Massey-Ferguson Inc., Racine, Wis., a corporation of Maryland
Filed June 5, 1959, Ser. No. 818,402
4 Claims. (Cl. 130—26)

The present invention relates generally to agricultural harvesting and threshing machines, or combines, and concerns more particularly the separation of grain kernels from the associated straw, chaff and trash which is harvested with the grain.

Present day combines utilize three basic assemblies for separating the grain kernels from the material making up the remainder of the harvested mass. These units are the beater or thresher assembly, usually in the form of a cylinder and cooperating concave; the straw walker assembly, usually in the form of a plurality of adjacent, oscillating, rack-like members; and the shaker shoe assembly, usually in the form of screens overlying an upwardly directed blast of air from a fanning mill.

In combines of the above types, designers and manufacturers have aimed at obtaining an over-all operating efficiency of approximately 98½%. In other words, it has been the objective to separate and clean 98½% of the grain kernels harvested, and to permit only 1½% of the grain to be discharged with the straw material and lost.

As has been well known to those skilled in the art, maintaining combine efficiency has become more and more difficult in recent years. The conventional combine grain separating units referred to above function most efficiently at an optimum loading which is somewhat below their peak capacity. Although the average yield of grain per acre has steadily increased through modern farming methods, combine operators continue to operate their machines as rapidly as possible. Thus, the grain separating uits have been pushed to the limits of their capacity with the result that combine efficiency has fallen off.

Accordingly, it is the primary object of the present invention to provide a novel structure and method for substantially increasing combine efficiency, particularly when the grain separating units of the combine are operating at high capacity.

With more detail, it is an object to provide a combine with a novel form of straw walker construction together with a fan assembly arranged to provide a positive air blast cooperating with the straw walkers so as to greatly increase the grain separating efficiency of the combine.

In one of its aspects, it is an object to provide a straw walker construction as characterized above which materially facilitates grain separation in a combine while being quite economical to manufacture.

It is also an object of the invention to provide a structure as referred to above which can be easily and economically embodied in present combines without drastic revision of combine design, either as original equipment on new machines or as a modernizing feature on machines already in use.

Other objects and advantages of the invention will become apparent upon reading the following detailed description, and upon reference to the drawings in which.

While the invention will be described in connection with a preferred embodiment, it will be understood that we do not intend to limit the invention to that embodiment. On the contrary, we intend to cover all alternatives, modifications and equivalents as may be included within the spirit of the invention as defined by the appended claims.

Figure 1:
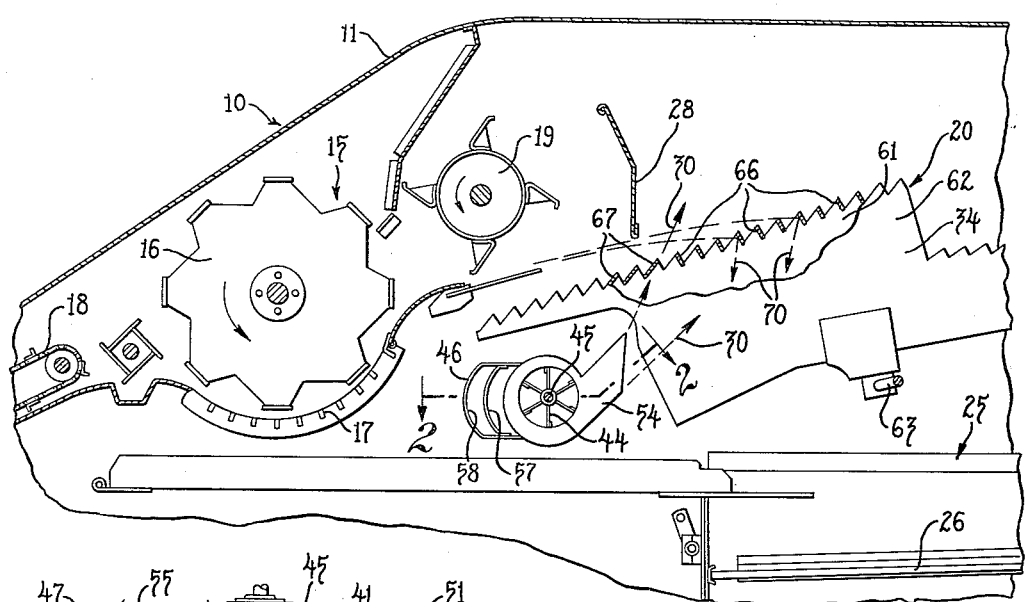
FIGURE 1 is a longitudinal section of a fragment of a combine in which the present invention is embodied.
Figure 2:
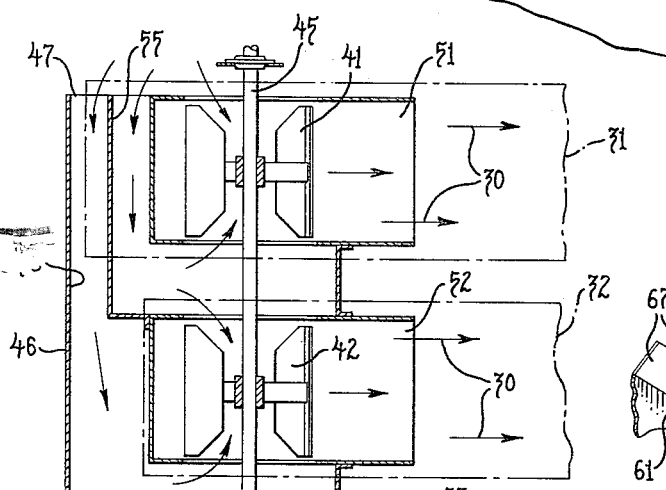
FIG. 2 is an enlarged fragmentary section taken approximately along the line 2—2 of FIG. 1.
Figure 3:
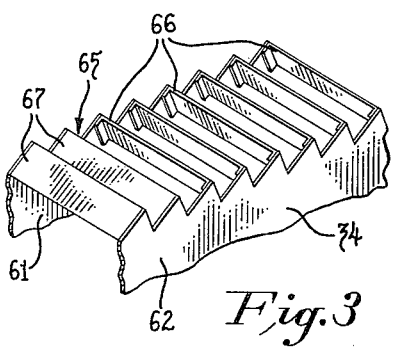
FIG. 3 is a perspective of a fragment of one of the straw walkers shown in FIGS. 1 and 2.

Turning now to the drawings, FIG. 1 shows a portion of a combine 10 in which the invention has been embodied. The combine portion illustrated includes a main frame or housing 11 which supports the assemblies for separating grain kernels from the associated straw, chaff and trash which is harvested with the grain.

The grain separation assemblies include a beater or thresher assembly 15 having a rotatably driven cylinder 16 and a cooperating concave 17. Harvested material is carried to the thresher assembly 15 by an elevator 18, of which only a portion is shown, and the material is discharged rearwardly from the thresher assembly by a rapidly driven rear beater 19.

Positioned behind the thresher assembly is a straw walker assembly 20 which receives the threshed material from the thresher assembly 15, and located beneath the straw walker assembly 20 is a shaker shoe assembly 25 which includes a plurality of screens 26 disposed in the path of an air blast generated by the combine fanning mill, not shown.

As will be well understood by those skilled in the art, the material harvested by the combine 10 is gathered at the front end of the combine and lifted by the elevator 18 to the thresher assembly 15. The harvested material is beaten or threshed by the rotating cylinder 16 against the concave 17 so as to dislodge and loosen the grain kernels from the associated straw and trash. The harvested mass is then thrown rearwardly from the thresher assembly in a generally horizontal direction onto the straw walkers of the assembly 20, with the rear beater 19 directing and controlling the impetus given to the rearward movement of the material.

Preferably, a curtain 28 is disposed behind the rear beater 19 to control the throw of the harvested material. The curtain 28 is flexible so that it may deflect upwardly to permit the passage of heavy loads of harvested material.

The straw walker assembly 20 serves both as a straw and trash conveyor to "walk" the straw and trash rearwardly and out of the combine and also as an agitated screen to shake the grain kernels loose from the remainder of the harvested mass and allow them to drop downwardly. The grain kernels which are separated from the harvested material by the thresher assembly 15 and by the straw walker assembly 20 fall beneath these assemblies and are channeled onto the shaker shoe screens 26 where the air blast from the fanning mill completes the grain cleaning and separating operation of the combine.

Pursuant to the invention, the straw walkers in the assembly 20 are vertically open and a blast of air is directed upwardly through the vertically open walkers against the harvested material as it falls onto the walkers. Preferably, this air blast, designated by the arrows 30, is inclined rearwardly in the direction of grain movement and impinges against the mass of harvested material at the point where the majority of loosened grain kernels thrown rearwardly from the thresher assembly lose their horizontal momentum and begin to drop downwardly.

There are several important effects of this arrangement. First, the air blast designated by the arrows 30 is effective to cause the solid, rapidly moving stream of grain, straw, chaff and trash discharged by the rear beater 19 to open up and expand rather than allowing the material to tumble and tightly pile up. The air blast fluffs the harvested material and keeps it open, porous and loose. Under these conditions, the grain kernels readily separate from the remainder of the harvested mass, for two basic reasons. One, the kernels, being heavier than the associated chaff, are drawn downwardly through the loosely fluffed mass by the force of gravity. Two, the kernels being small and rounded, are less affected by an air stream than the associated material and hence the kernels drop downwardly through the air blast while the larger surrounding particles are suspended or carried upwardly.

A second important effect of the described method and construction is that the air blast indicated by the arrows 30 drives off the chaff portion of the harvested material. Since the chaff is extremely light, the air blast lifts it upwardly and rearwardly so that it does not have chance to fall down and become intertwined and matted either on the straw walkers or on the screens 26 of the shaker shoe assembly, and these mechanisms therefore do not become clogged and inefficient.

Another important result of the present arrangement is to facilitate prompt separation of the grain kernels from the remainder of the harvested mass at the extreme forward end of the straw walker assembly 20. In other words, substantially all of the grain kernels are separated while the harvested material is kept loose and fluffy by the upwardly directed air blast, and therefore few kernels remain associated with the straw and trash when the latter are carried over the rear portion of the straw walker assembly. With conventional arrangements it has been found that the straw and chaff passing along the straw walker assembly tends to form a mat that entraps remaining grain kernels. The entrapped grain is ultimately discharged with the straw and chaff and is lost.

Still another advantage of the present invention is that the straw walkers can be operated at higher speeds to achieve faster straw "walkout." In other words, since the air blast indicated by the arrows 30 facilitates faster separation of the grain from the remainder of the harvested material, the entire mass of material can be carried rearwardly more rapidly by driving the straw walkers at a higher rate. Thus, the layer of material being supported and moved by the straw walkers will be thinner so that there is very little tendency for this material to pack down or become matted.

The over-all result of the above specific operating features is that the present invention is able to greatly extend the capacity of a combine by maintaining high separation efficiency when the combine is loaded up to and far above "normal" capacity. As was previously pointed out, the efficiency of a combine, that is, its ability to separate and recover grain from the harvested mass, begins to drop off sharply as the grain separating assemblies are loaded more and more heavily. This drop in efficiency thus imposes a practical limitation on the capacity of conventional combines. However, in a combine embodying the present invention and for the reasons described above, it has been found that efficiency does not drop off appreciably at the former top capacity levels so that the grain separating assemblies can be operated at much higher loadings without sacrificing grain separation efficiency.

In carrying out the invention, each of the straw walkers in the assembly 20 is associated with an air blast generating fan and discharge duct, so that a positive, properly directed blast of air is provided for each straw walker, and each fan is adequately supplied with air. In the present embodiment, the assembly is made up of four adjacent and generally parallel walkers 31, 32, 33 and 34, and four air blast generating fans 41, 42, 43, and 44 are positioned below the straw walkers 31–34, respectively. Preferably, each of the fans 41–44 are mounted on a common drive shaft 45 and are positioned within an air chest 46 having opposite open sides 47 and 48 and which extends transversely across the combine 10 beneath the straw walker assembly 20. Each of the fans 41–44 is provided with a discharge duct, designated 51–54, respectively, which extends from the air chest 46 and directs the air blast from its associated fan in the proper upward and rearward direction through the straw walkers of the assembly 20.

In order to provide an adequate supply of air to each of the fans 41–44, the air chest 46 is subdivided into passages which extend from the open sides 47, 48 to each of the fans. That is, a passage 55 supplies air to one side of each of the fans 41, 42, a passage 56 supplies air to the opposite side of the fan 42, a passage 57 supplies air to one side of each of the fans 43, 44, and a passage 58 supplies air to the opposite side of the fan 43. Air is supplied to the outer sides of the fans 41–44 directly through the open sides 47, 48 of the air chest. It can thus be seen that each of the fans, including those positioned at the center of the air chest 46, are provided with adequate supplies of air to be driven upwardly in order to create air blasts of equal volume and velocity.

In keeping with the invention, each of the straw walkers 31–34 is constructed to facilitate grain separation by utilizing the inertia of the thrown grain kernels, as well as being vertically open to permit passage of the air blasts from the fans 41–44. To accomplish this, each straw walker includes an elongated, oscillatable frame made up of a pair of spaced parallel side plates 61, 62. The side plates 61, 62 are vertically mounted on cranks, of which only the crank 63 is illustrated, and rotation of the cranks gives the straw walkers a staggered, four-way motion as will be understood by those skilled in the art.

Defining the tops of the straw walkers 31–34 are a series of plates 65 which are secured transversely at the top of the walker frames between the side plates 61, 62. An adjacent group 66 of the plates 65, underlying the area on each straw walker where the majority of grain kernels fall, are arrayed in generally parallel relation and are inclined so as to deflect impinging grain kernels downwardly. The remaining plates 67 of the series of plates 65 are angled so as to face the thrown material, and thus they are effective to ride the straw and trash rearwardly along the tops of the straw walkers and out of the combine when the walkers are driven.

The action of the adjacent group 66 of the plates 65 can be best seen with reference to FIG. 1 where typical paths of grain kernels thrown rearwardly from the rear beater 19 are traced by the arrows 70. It will be noted that the grain is thrown in a generally horizontal direction beneath the curtain 28 and that it comes into contact with the straw walkers in the area in which the plate group 66 is located. The grain kernels, being relatively heavy with respect to the other particles in the mass of harvested material, impinge with some force against the plates in the group 66, and the kernels are deflected downwardly by the inclined plates. Thus, the inertia stored in the grain kernels as they are thrown rearwardly from the rear beater 19 is utilized to propel them downwardly and separate them from the remainder of the harvested mass. It is important to note that the air blast designated by the arrows 30 blows upwardly through the straw walkers in the areas in which the plate groups 66 are located, and thus the air blasts keep the lighter and larger particles in the harvested mass from striking the downwardly inclined plates. For the most part, therefore, only the grain kernels themselves contact the downwardly inclined plates and are deflected beneath the straw walkers.

It has been found that for best results the air blasts indicated by the arrows 30 should preferably impinge against the threshed mass of material just as it falls onto the straw walkers, and that the air blasts should be aimed in the direction of grain movement as well as upwardly. Furthermore, the air blast velocities at the top of the straw walkers found to be most effective lie in the range of 1800 to 2800 feet per minute.

It can be seen that the invention can be practiced by utilizing straw walker and air blast producing fan constructions which are quite economical to manufacture and which can be easily installed either as original equipment on new machines or as a modification to existing machines without drastic revision of combine design. The provision of straw walkers with the downwardly inclined plate group 66 greatly facilitates the separation of grain kernels already enhanced by the upwardly directed air blasts.

We claim as our invention:

1. In a combine, the combination comprising, a thresher assembly for operating on harvested material and adapted to throw the harvested material in a generally horizontal direction, a plurality of elongated, relatively oscillatable frames disposed in the path of the grain thrown from the thresher assembly, a series of inclined, closely spaced plates secured transversely along the top of each of said frames, an adjacent group of said plates being generally parallel to one another and inclined with respect to said horizontal direction so as to deflect impinging grain kernels downwardly between adjacent plates, the remaining plates on said frames being angled to face the thrown material so as to ride the straw and trash portions of the harvested material along the tops of said frames, an open-sided air chest extending transversely of the combine beneath said frames, a plurality of air blast generating fans positioned in said chest with one fan beneath each one of said frames, said fans being aimed so as to direct air blasts upwardly through the spaced plates, and passages extending from the open sides of said air chest to each of said fans for supplying air thereto.

2. In a combine having means for threshing harvested grain and throwing it generally horizontally after threshing, straw walkers for receiving the thrown grain comprising, in combination, a plurality of elongated, relatively oscillatable frames disposed in the path of the grain thrown from the threshing means, a series of inclined, closely spaced plates secured transversely along the top of each of said frames, an adjacent group of said plates, positioned in the area on each frame where the majority of the harvested grain kernels fall, being generally parallel to one another and inclined with respect to said horizontal direction so as to deflect impinging grain kernels downwardly between adjacent plates and the remaining plates on said frame being angled to face the thrown material as it is thrown in said horizontal direction so as to ride the straw and trash portions of the harvested material along the tops of said frames.

3. In a combine having means for threshing harvested grain and throwing it generally horizontally after threshing, a straw walker for receiving the thrown grain comprising, in combination, an elongated, oscillatable frame disposed in the path of the grain thrown from the threshing means, a series of inclined plates secured transversely along the top of said frame, an adjacent group of said plates being generally parallel to one another and inclined with respect to said horizontal direction so as to deflect impinging grain kernels downwardly between adjacent plates, and the remaining plates on said frame being angled to face the thrown material as it is thrown in said horizontal direction so as to ride the straw and trash portions of the harvested material along the top of said frame.

4. In a combine having means for threshing harvested grain and throwing it generally horizontally after threshing, straw walkers for receiving the thrown grain comprising, in combination, a plurality of elongated, relatively oscillatable frames disposed in the path of the grain thrown from the threshing means, said frames being vertically open, a series of inclined closely spaced plates secured transversely along the top of each of said frames, an adjacent group of said plates, positioned in the area on each frame where the majority of the harvested grain kernels fall, being generally parallel to one another and inclined so as to deflect impinging grain kernels downwardly between adjacent plates, the remaining plates on said frames being angled to face the thrown material so as to ride the straw and trash portions of the harvested material along the tops of said frames, and means for directing an air blast upwardly through said vertically open frames and between said spaced plates, so as to fluff the harvested material and keep it loose and porous.

References Cited in the file of this patent

UNITED STATES PATENTS

| | | |
|---|---|---|
| 277,347 | Roberts et al. | May 8, 1883 |
| 746,431 | Absalom | Dec. 8, 1903 |
| 792,516 | Hanlon et al. | June 13, 1905 |
| 1,884,114 | Moroney | Oct. 25, 1932 |
| 2,849,118 | Ashton | Aug. 26, 1958 |

FOREIGN PATENTS

| | | |
|---|---|---|
| 629,871 | France | Aug. 8, 1927 |